US007057716B2

(12) United States Patent
Yap

(10) Patent No.: US 7,057,716 B2
(45) Date of Patent: Jun. 6, 2006

(54) WHITE CELL ANTENNA BEAMFORMERS

(75) Inventor: Daniel Yap, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 244 days.

(21) Appl. No.: 10/696,607

(22) Filed: Oct. 28, 2003

(65) Prior Publication Data

US 2005/0088339 A1 Apr. 28, 2005

(51) Int. Cl.
*G01B 11/26* (2006.01)

(52) U.S. Cl. .................... 356/141.5; 356/5.1; 342/375

(58) Field of Classification Search .............. 356/141.5
See application file for complete search history.

(56) References Cited

U.S. PATENT DOCUMENTS

| | | | | |
|---|---|---|---|---|
| 4,346,315 | A * | 8/1982 | Roberts | 327/277 |
| 4,725,844 | A | 2/1988 | Goodwin et al. | 342/374 |
| 5,369,410 | A | 11/1994 | Reich | 342/175 |
| 5,374,935 | A | 12/1994 | Forrest | 342/368 |
| 5,475,392 | A | 12/1995 | Newberg et al. | 342/375 |
| 5,583,516 | A | 12/1996 | Lembo | 342/375 |
| 5,631,758 | A | 5/1997 | Knox et al. | 359/127 |
| 5,661,582 | A | 8/1997 | Kintis et al. | 398/121 |
| 5,751,242 | A | 5/1998 | Goutzoulis et al. | 342/158 |
| 5,859,719 | A | 1/1999 | Dentai et al. | 359/171 |
| 5,861,845 | A | 1/1999 | Lee et al. | 342/375 |
| 5,867,291 | A | 2/1999 | Wu et al. | 359/124 |
| 5,926,298 | A | 7/1999 | Li | 359/120 |
| 5,999,128 | A | 12/1999 | Stephens et al. | 342/375 |
| 6,181,449 | B1 | 1/2001 | Taga et al. | 359/124 |
| 6,198,721 | B1 | 3/2001 | Mueller | 370/223 |
| 6,204,944 | B1 | 3/2001 | Uchivama et al. | 359/123 |
| 6,208,444 | B1 | 3/2001 | Wong et al. | 359/127 |
| 6,229,937 | B1 | 5/2001 | Nolan et al. | 385/24 |
| 6,246,500 | B1 | 6/2001 | Ackerman | 398/115 |
| 6,266,176 | B1 * | 7/2001 | Anderson et al. | 359/245 |
| 6,271,949 | B1 | 8/2001 | Suemura et al. | 359/128 |

(Continued)

FOREIGN PATENT DOCUMENTS

EP 0 392 416 A1 10/1990

(Continued)

OTHER PUBLICATIONS

U.S. Appl. No. 10/196,444, filed Jul. 15, 2002, Stephens.

(Continued)

*Primary Examiner*—Thomas H. Tarcza
*Assistant Examiner*—Luke Ratcliffe
(74) *Attorney, Agent, or Firm*—Ladas & Parry LLP

(57) ABSTRACT

A merged dual flipped White Cell including a White Cell having upper and lower cell regions; an optical deflector array for selectively deflecting light to either an upper image plane associated with said upper region or to a lower image plane associated with said lower region; a plurality of optical delay lines for receiving and returning delayed light at said upper image plane; and a plurality of reference mirrors and optical input and output ports in optical communication with said deflector array and with said plurality of delay lines. A wavelength tapped delay White Cell including a White Cell optical cavity having a flat mirror plane on a first side thereof and curved mirrors on a second side thereof, the flat mirror plane having an array of frequency-selective taps. Also disclosed are cascaded antenna beamforming systems comprising one or more merged dual flipped White Cells and/or one or more wavelength tapped delay White Cells.

55 Claims, 8 Drawing Sheets

U.S. PATENT DOCUMENTS

| | | | | |
|---|---|---|---|---|
| 6,337,660 | B1 | 1/2002 | Esman et al. | 342/375 |
| 6,348,890 | B1 | 2/2002 | Stephens | 342/375 |
| 6,388,815 | B1 * | 5/2002 | Collins et al. | 359/633 |
| 6,452,546 | B1 | 9/2002 | Stephens | 342/368 |
| 6,525,889 | B1 * | 2/2003 | Collins et al. | 359/836 |
| 6,674,939 | B1 | 1/2004 | Anderson et al. | 385/27 |
| 6,724,951 | B1 | 4/2004 | Anderson et al. | 385/15 |
| 6,766,073 | B1 | 7/2004 | Anderson | 385/18 |
| 6,768,458 | B1 | 7/2004 | Green et al. | 342/375 |
| 2002/0012144 | A1 | 1/2002 | Lin et al. | 359/130 |
| 2002/0061157 | A1 * | 5/2002 | Ducellier et al. | 385/17 |
| 2002/0180637 | A1 * | 12/2002 | Stephens | 342/368 |
| 2002/0181874 | A1 * | 12/2002 | Tulchinsky et al. | 385/39 |

FOREIGN PATENT DOCUMENTS

| | | |
|---|---|---|
| EP | 0 664 465 A2 | 7/1995 |
| WO | 01/15269 A1 | 3/2001 |

OTHER PUBLICATIONS

U.S. Appl. No. 10/196,480, filed Jul. 15, 2002, Stephens.

U.S. Appl. No. 10/632,354, Jul. 31, 2003, Stephens.

*Reference Data for Engineers: Radio, Electronics, Computer, and Communications,* Seventh Edition, Howard W.Sams & Co., Indianapolis, pp. 32-39 through 32-41 (1988).

Anderson, B.L., et al., "Binary-Counting True Time Delay Generator Using a White Cell Design and Deformable Mirror Devices," *IEEE,* pp. 273-274 (1998).

Anderson, B.L., et al., "Optically Produced True-Time Delays for Phased Antenna Arrays," *Applied Optics,* vol. 36, No. 32, pp. 8493-8503 (Nov. 10, 1997).

Curtis, D.D., "Holographic Rotman Lens for Phased-Array Antenna Beamforming," *SPIE,* vol. 2481 pp. 104-113.

Gopalakrishnan, G.K., et al., "Microwave-Optical Mixing in $LiNbO_3$ Modulators," *IEEE Transactions on Microwave Theory and Techniques,* vol. 41, No. 12, pp. 2383-2391 (Dec. 1993).

Li, R.L.Q., et al., "3-Bit Substrate-Guided-Mode Optical True-Time-Delay Lines Operating at 25 GHz," *IEEE Photonics Technology Letters,* vol. 9, No. 1, pp. 100-102 (Jan. 1997).

Logan, R.T., Jr., et al., "Millimeter-Wave Photonic Downconvertors: Theory and Demonstrations," *Proceedings f SPIE Conference on Optical Technology for Microwave Applications VII,* San Diego, CA, (Jul. 9-14, 1995).

Sparks, R.A., "Progress in Optical Rotman Beamformaer Technology," *IEEE,* pp. 357-360 (2000).

Stimson, G.W., "Advanced Radar Techniques," *Introduction to Airborne Radar,* Second Edition, SciTech Publishing, Mendham, NJ, Ch. 40, p. 513.

White, J.U., "Long Optical Paths of Large Aperture," *J.O. S.A.,* vol. 32, pp. 285-288 (May 1942).

* cited by examiner

WHITE CELL ANTENNA BEAMFORMERS

RELATED APPLICATIONS

This patent application is related to U.S. Ser. No. 10/196,444, filed Jul. 15, 2002, which is a divisional application of U.S. Ser. No. 09/593,188, filed Jun. 14, 2000 and now issued U.S. Pat. No. 6,452,546. This application is also related to U.S. Ser. No. 10/196,480, filed Jul. 15, 2002, which is a divisional application of U.S. Ser. No. 10/196,444. This application is further related to U.S. Ser. No. 10/003,396, filed Oct. 22, 2001 and now issued U.S. Pat. No. 6,535,165, which is a divisional application U.S. Ser. No. 09/383,819, filed on Aug. 26, 1999 and now issued U.S. Pat. No. 6,348,890. This application is also related to U.S. Ser. No. 10/696,607, filed on Oct. 28, 2003. This application is further related to U.S. Ser. No. 10/632,354, filed Jul. 31, 2003, which is a divisional application of U.S. Ser. No. 10/196,480. This application is further related to U.S. Pat. No. 6,266,176, which is incorporated by reference in its entirety; U.S. Pat. No. 6,348,890, which is incorporated by reference in its entirety; and U.S. Pat. No. 6,388,815, which is incorporated by reference in its entirety. This application is further related to U.S. Pat. No. 6,452,546.

TECHNICAL FIELD

This invention relates to White Cells that generate optical time delays for antenna beam forming. Two types of White Cells are disclosed. One type of White Cell is a Merged Dual Flipped (MDF) White Cell that contains switched optical delay lines. The other type of White Cell is a Wavelength Tapped Delay (WTD) White Cell that contains optical delay lines of fixed length.

BACKGROUND INFORMATION REGARDING THE INVENTION AND DISCUSSION OF THE PRIOR ART

Two types of White Cell optical time-delay units for antenna beam forming are disclosed. One type of White Cell is a Merged Dual Flipped (MDF) White Cell that contains switched optical delay lines. This component is a composite of two White Cell optical cavities that share portions of a common reflector. Light is directed into either one or the other White Cell cavity according to the angular tilts of an array of optical mirrors located on the common reflector. The other type of White Cell is a Wavelength Tapped Delay (WTD) White Cell that contains optical delay lines of fixed length. These delay lines are accessed by tapping into or out of the single White Cell optical cavity through a set of Fabry-Perot (FP) transmission filters. Different FP filters transmit light of different wavelengths. Thus, the use of different wavelengths of light provides access to different delay line lengths.

The MDF and WTD White Cells can be cascaded together. In this cascade, one type of White Cell can define the antenna beam for one axis (e.g., azimuth) and the other type of White Cell can define the antenna beam for the other axis (e.g., elevation). Alternatively, the two types of White Cell in the cascade can define coarse and fine beam positions. Either White Cell type can be placed closer to the antenna aperture in this cascade, but the order of placement can affect the preferred orientation of the WTD White Cell.

The disclosed White Cell technology may be used with steerable antennas such as phased arrays. It is especially useful for wide band or large antenna systems, for which beam squint would be a problem, for both military and commercial applications.

The White Cells disclosed herein and their cascaded combination achieve true-time-delay beam forming for phased array antennas. The true-time-delay approach and use of optical delay lines permit squint-free beam forming for signals with very large instantaneous band widths and for multi-band signals of very different frequencies. The White Cells are compact and use the same physical space for a large number of optical delay and switching paths.

The MDF White Cell is compatible with long sequences of delay lines having lengths that are a binary progression (lengths that are multiples of two greater than each other). In contrast, prior White Cells for beam forming direct the light successively between at most three different possible segment lengths. Thus, the disclosed MDF White Cell requires a smaller number of optical switches to select a particular time delay.

The WTD White Cell is a free-space optical implementation of a RF Rotman lens. Most prior optical Rotman lenses have been constructed from optical-fiber delay elements. The optical delay paths of the WTD White Cell share the same physical space. Thus, the WTD White Cell can be more compact than prior optical Rotman lenses. Also, the WTD White Cell can use optical wavelength demultiplexing and multiplexing to split and combine signals, respectively. Prior Rotman lenses would require optical-phase sensitive combiners or very long delay paths that exceed the optical coherence length.

Since the WTD White Cell makes use of the optical wavelength to select the lens port (or combine the optical signals) and the MDF White Cell is independent of the optical wavelength, they can be cascaded together. The cascade can achieve more antenna beam angles or positions than either White Cell alone and can be used with larger antennas having more array elements.

A conventional White Cell is an optical cavity comprising three reflective surfaces. It was first described by J. U. White in a publication in *Journal of Optical Society of America*, vol. 32, pp. 285–288 (1942). The use of White Cells to achieve optical time delays suitable for antenna beamforming is described by Anderson and Collins in U.S. Pat. Nos. 6,388,815 and 6,266,176 as well as in their publications in *Applied Optics*, vol. 36, no. 32, pp. 8493–8503 (1997) and in *Conference Proceedings of* 1998 *IEEE LEOS*, Annual Meeting, pp. 273–274 (1998). These prior art White Cells utilize switched delay lines that require a large number of optical switches to select a given delay path, since those paths are composed of segments having a small number (typically two or three) of different lengths. The approach described in the LEOS publication makes use of binary-length delay segments instead. The publication states that those segments can be constructed from glass blocks (a glass channel with reflective walls is presumed), lens trains (re-imaging the light is presumed) or fibers (to confine or guide the light). The glass blocks and lens trains should work, but are physically large and cumbersome. How the fibers would be connected to the White Cell is not discussed in the LEOS publication. A seemingly straightforward approach might be to have fibers of different lengths and to connect the ends of those fibers to the "delay plane". But such an approach would not work since light exiting a fiber would be imaged back onto the fiber rather than being directed to the array of mirrors (the DMDs). The present disclosure teaches how to make connections to optical-fiber delay lines in a different and non-obvious way, through additional optical waveguide connectors.

With all of these prior art White Cells, each column of optical switches (the spatial light modulators or the DMDs) define a single programmable delay and have a single set of input and output. In contrast, the MDF White Cell of the present invention can define multiple delays and can have multiple inputs and outputs for each column. The result, when combined with the binary length delay lines, is a more efficient use of the White Cell volume.

The WTD White Cell of this disclosure has a single White Cell cavity and taps light into and out of the White Cell at multiple points in a given column. The prior single-cavity White Cells do not have this capability. This tapping allows the single White Cell cavity to be able to generate simultaneously a variety of delay path lengths with each column. In contrast, prior single-cavity White Cells could generate only a single delay path length for each column.

Some optical implementations of RF Rotman lenses are reviewed by R. A. Sparks in a paper presented at the 2000 *IEEE International Conference on Phased Array Systems and Technology* (see the conference proceedings, pages 357–360). Sparks and other researchers also have constructed and demonstrated various optical Rotman lenses. These prior works do not associate different optical wavelength with different lens ports. U.S. Pat. No. 6,348,890 by Ronald R. Stephens, which patent is owned by the assignee of this application, describes the use of multiple optical wavelengths with an optical Rotman lens implemented with optical fiber delays. Proper choice of these wavelengths permits efficient combining of delayed signals with photodetectors (as described by Stephens in U.S. Pat. No. 6,452,546, which patent is owned by the assignee of this application).

The WTD White Cell disclosed herein makes use of free-space optical delays that are confined within a White Cell cavity instead of the optical fibers. Thus, the disclosed WTD White Cell implementation can be more compact than other implementations. A prior art Rotman lens that uses free-space optical delay paths is described by Curtis in *SPIE Proceedings*, vol. 2481, pp. 104–115 (1985). That prior lens performs the signal combining in the optical domain and is sensitive to the optical phase differences in the various paths to a given lens port. In contrast, the WTD White Cell disclosed herein makes use of optical-heterodyne signals combining at the photodetector. Thus, the signals are combined in the RF domain and that combining process is not sensitive to the optical phases.

The disclosed MDF White Cell is different from the White Cell described in the LEOS publication in that it has multiple input/output ports for each column of reflector switches. Also, it makes use of optical waveguides (preferably formed on a substrate) whose ends are tilted with respect to the endface of the substrate. This tilt causes the light to enter and exit the waveguides at an angle. The tilted waveguide entrances/exits thus appear like a standard reflective surface since incoming light that is angled with respect to the endface results in outgoing light that is at the corresponding opposite angle. The tilted waveguides are used for both accessing the delay lines of the MDF White Cell and accessing the input/output fibers. The tilted waveguides make it possible to have multiple input/output ports (and multiple switched delay lines) in each column. So far as the inventor is aware, such tilted waveguides have not been used or associated with White Cells or with optical methods for antenna beamforming.

The WTD White Cell is an optical implementation of the Rotman lens and is based on free-space optical delay paths confined in an optical cavity. Prior optical Rotman lenses do not use both free-space optical delay and optical cavity confinement. The WTD White Cell also uses taps in the cavity to obtain different delay path lengths. Prior optical Rotman lenses use optical fibers cut to different lengths, instead. Tapped optical delay lines have been used to produce time delays for antenna beam forming. Such an approach is described by Li and Chen in *IEEE Photonics Technology Letters*, vol. 9, no. 1, pp. 100–103 (1997). This prior approach taps light out from every upper-side reflection of each delay line path and does not make use of different optical wavelengths. In contrast, the approach of the present disclosure taps light out from only one of the upper-side reflections of a given delay-line path for a given wavelength. Different wavelengths tap the light from different upper-side reflection points.

BRIEF DESCRIPTIONS OF THE INVENTION

In one aspect the present invention relates to a merged dual flipped White Cell including: a dual White Cell having first and second cell regions; an optical deflector array for selectively deflecting light to either a first image plane associated with the first region or to a second image plane associated with the second region; a plurality of guided-wave optical delay lines, each of the delay lines having an input portion for receiving light at the first image plane and a separate output portion for returning delayed light at the first image plane; and a plurality of reference mirrors and separate guided-wave optical input and output ports in optical communication with the optical deflector array and with the plurality of delay lines.

In another aspect the invention relates to a wavelength tapped delay White Cell including a White Cell optical cavity having a flat mirror plane on a first side thereof and curved mirrors on a second side thereof, the flat mirror plane having an array of frequency-selective taps.

In another aspect the invention relates an antenna beamformer system comprising one or more wavelength tapped White Cells with optical modulators connected to an input of one of the one or more wavelength tapped White Cells and a plurality of photodetectors coupled to frequency selected taps of the wavelength tapped White Cells.

In still yet another aspect the present invention relates to an antenna beamformer including a cascaded arrangement of one or more Wavelength Tapped Delay White Cells and/or one or more Merged Dual Flipped White Cells.

In another aspect the present invention relates to a method of forming and/or detecting a radio frequency beam at an antenna array, the method including applying light waves of a single wavelength or of a plurality of discrete wavelengths to at least one optical modulator coupled to at least one wavelength tapped delay White Cell, wherein the at least one wavelength tapped delay White Cell has a White Cell optical cavity with a flat mirror plane on a first side thereof and curved mirrors on a second side thereof, the flat mirror plane having an array of frequency-selective taps; applying RF signals to the at least one optical modulator and generating RF modulated light waves that are coupled to the at least one wavelength tapped delay White Cell, whereby the at least one wavelength tapped delay White Cell generates a plurality of time-delayed RF modulated light waves in response thereto; and coupling the plurality of time-delayed RF modulated light waves to at least one photodetector coupled to the the at least one wavelength tapped delay White Cell.

In still another aspect the present invention relates to a method of forming and/or detecting a radio frequency beam at an antenna array, the method including: applying light waves of a single wavelength or of a plurality of discrete wavelengths to at least one merged dual flipped White Cell, the merged dual flipped White Cell including a dual White Cell with first and second cell regions, an optical deflector array for selectively deflecting light to either a first image plane associated with the first region or to a second image plane associated with the second region, a plurality of guided-wave optical delay lines, each of the delay lines having an input portion for receiving light at the first image plane and a separate output portion for returning delayed light at the first image plane, and a plurality of reference mirrors and separate guided-wave optical input and output ports in optical communication with the optical deflector array and with the plurality of delay lines; applying RF signals to the at least one optical modulator and generating RF modulated light waves that are coupled to the at least one merged dual flipped White Cell, whereby the at least one merged dual flipped White Cell generates a plurality of time-delayed RF modulated light waves in response thereto; and coupling the plurality of time-delayed RF modulated light waves to at least one photodetector coupled to the the at least one merged dual flipped White Cell.

DETAILED DESCRIPTION OF THE INVENTION

Overview

This invention disclosure relates to two different techniques for producing true-time delays using optical delay paths. One technique is based on switching between delay lines of various lengths and reference delay segments. This technique is implemented by a Merged Dual Flipped (MDF) White Cell. A second technique is based on wavelength-selected taps in optical delay paths. This method is implemented by a Wavelength Tapped Delay (WTD) White Cell. The WTD White Cell can be used as an optical implementation of a Rotman lens beamformer. Both techniques make use of the confinement of free-space propagating light provided by White Cell optical cavities. It is possible to cascade these two types of White Cell to construct a beamformer that has even more possible time-delay variations than can be obtained with either White Cell type alone. Two cascaded architectures are described herein.

A Merged Dual Flipped (MDF) White Cell

Figure 1B:
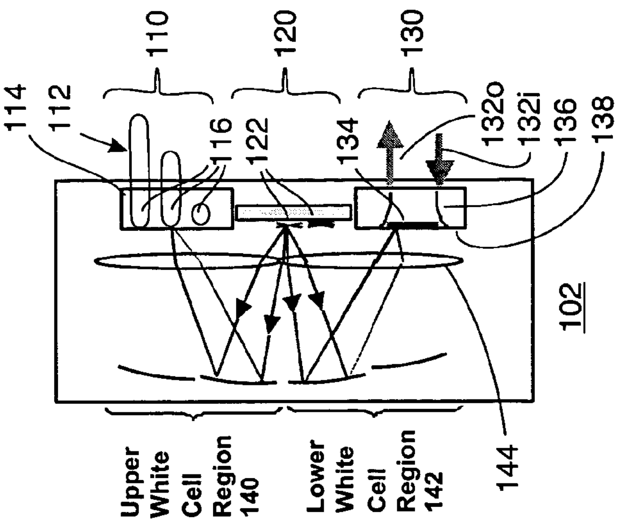
FIGS. 1*a* and 1*b* illustrate the construction of a Merged Dual Flipped (MDF) White Cell.
Figure 1C:
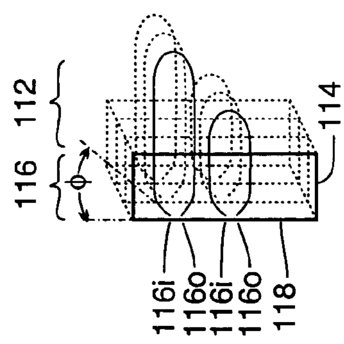
FIG. 1*c* is a more detailed, schematic view of a number of optical delay line chips or substrates used in the MDF White Cell.
Figure 1A:
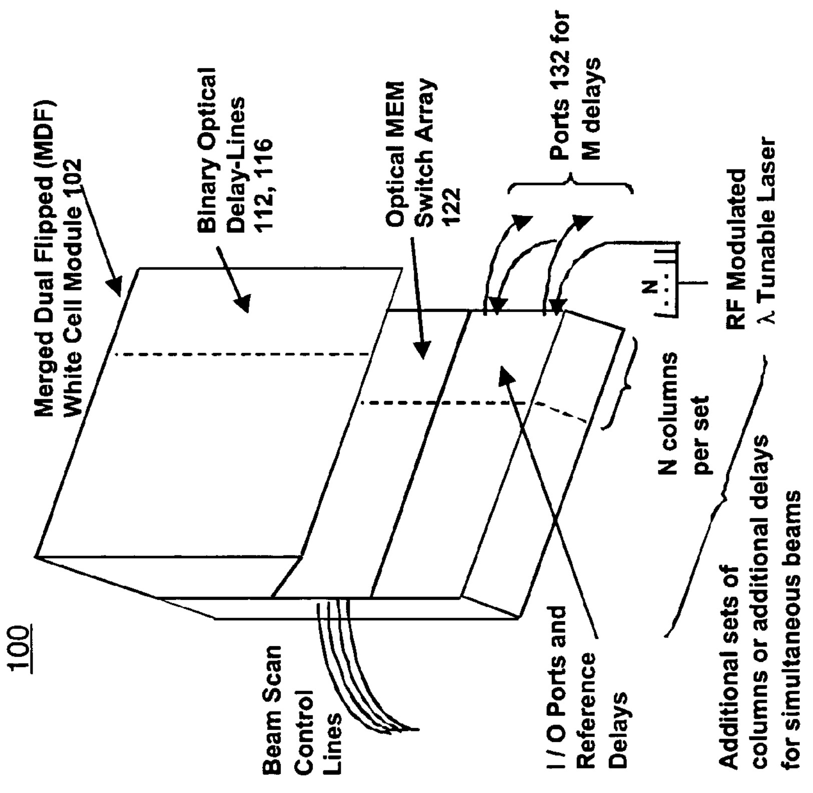

FIGS. 1*a* and 1*b* illustrate an embodiment of a MDF White Cell 100. FIG. 1*c* is similar to FIG. 1*b*, but provides more information to the reader. The disclosed embodiment preferably comprises multiple modules 102 of a MDF White Cell 100. Each module 102 has three sections: a first section 110 containing the binary optical delay lines 112, another section 120 containing the optical micro-electro-mechanical (O-MEM) mirror/switch array or grating 122, and a third section 130 containing optical-fiber input/output ports 132 and reference-delay mirrors 134. Each module 102 generates the optical time delays for a number of antenna-element groupings as well as for a number of beams. The specific number of and type of groupings and the number of beams are matters of design choice.

For example, assume that each module 102 can produce the time delays for eight simultaneous beams and 100 rows of antenna elements. B+2 O-MEM switches are needed to achieve B bits of distinct delays (i.e. B bits of angular resolution). Thus, this example requires an array of 9,600 O-MEM switches for 10-bit angular resolution in beam forming by this White Cell. A second MDF White Cell 100 can be cascaded with the first MDF White Cell 100 to produce the time delays for the columns of antenna elements. Thus, by cascading two such White Cells, we can accomplish beam forming in two axes. Additional modules of MDF White Cell 100 can be used to accommodate more simultaneous antenna beams and more rows and columns of antenna elements.

This embodiment of a White Cell structure is called a "Merged Dual Flipped" White Cell because two White Cells are flipped (one with respect to the other) and are merged into a single structure.

The optical delay lines, which are preferably formed, in part, by optical fibers 112 and, in part, by optical waveguides 116, have lengths that are preferably binary multiples of each other and are addressed by O-MEM mirrors/switches 122. A grating could alternatively be used instead of the O-MEM mirrors/switches to reflect light between the upper and lower cell regions. The delay lines 112, 116 of each module can be located on or accessed by a number of optical-waveguide chips 114. See also FIG. 1*c* which depicts a single chip 114 with delay lines 112, 116 in a solid line representation and depicts the fact that a number of such chips 114 would be used together by showing additional chips 114 and their delay lines in dashed lines. Optical waveguides 116 are provided on chips 114 and are preferably constructed as silica waveguides 116 on or in a silicon substrate of each chip 114. Silica-on-silicon waveguides 116 can be obtained from various commercial foundries. Each delay line 112, 116 may include a looped path 112 that terminates in input and output portions 116*i*, 116*o* that are implemented as optical waveguides 116 in chip 114. Those input and output waveguide portions 116*i*, 116*o* are tilted at angles of $+\phi$ and $-\phi$, respectively, with respect to the endface 118 of each waveguide chip 114. The reason for this tilting is to cause the endface 118 to act like a reflective surface (e.g. like a mirror) that also adds a prescribed delay to the reflected light. The amount of the delay is determined by the length of the delay line connected to the portion of the endface receiving and reflecting light. Note that the input and output angles ϕ for the loop are opposite, with respect to the incident-surface (i.e., the endface 118 of the chip 114) normal.

A number of chips 114 can be stacked together as represented by the dashed lines in FIG. 1*c*. Only a few chips 114 are shown stacked for ease of illustration, but in practice, many chips 114 may be so stacked. The endfaces 118 of these chips 114, when so stacked, define a large planar reflecting surface containing many input portions 116*i* onto which the light can be directed by means of the O-MEM mirrors/switches 122 and many output portions 116*o* from which appropriately delayed light emanates and returns to the O-MEM mirrors/switches 122. Since the input and output portions 116*i* and 116*o* are arranged in a two dimensional array when a number of chips 116 are stacked together, the O-MEM mirrors/switches 112 are similarly arranged in a two dimensional array so that the O-MEM mirrors/switches 112 are utilized to address the input and output portions 116*i* and 116*o* appropriately.

The delay lines can be implemented solely by optical waveguides 116 on the chip or by a combination of the optical waveguides 116 and optical fibers 112. The optical fiber delay segments 112 are coupled to and accessed through waveguide connector segments 116 located on the silica-on-silicon chip 114. As an example, consider an antenna having a width of 10 meters that would require a maximum time delay equivalent to a path difference of 17.3 meters. This would be accomplished by a cascade of optical guided-wave delay lines whose lengths decrease in a binary progression with the maximum length being 5.8 meters. Note that the optical refractive index for silica optical fibers 112 and waveguides 116 is approximately 1.5. The minimum length of the optical delay lines depends on the number of rows or columns in the antenna, on the desired angular scan range and on the highest frequency of the signal, which determine the angular resolution. If the antenna has 10-bit angular resolution, the shortest optical delay line has a length of approximately 0.6 cm. The shorter delay lengths could be implemented solely by using optical waveguides formed in the silica-on-silicon substrate. Longer lengths call for a combination of optical waveguide and optical fiber. Note also that optical fibers have a lower attenuation, of 0.1 dB/km, compared to a silica waveguide attenuation of 0.1 dB/cm, and thus this is another reason for using optical fiber with the optical waveguides to provide the requisite delay. The length precision of silica waveguide delay lines, which are patterned by photolithography techniques, can be better than several micrometers. Optical fibers can be cut and polished to a length precision of better than 0.1 cm.

Each MDF White Cell 100 module contains a second set of waveguides 136 and reflectors (mirrors) 134 that are used for the input/output from the module 102 and for establishing reference delay paths. The lower image plane 138 is defined by the endfaces of a stack of silica-on-silica waveguide chips 133 that are preferably similar to chips 114 (and preferably equal in number), but instead of inserting additional delay, each chip 138 either inserts no additional delay (as the light is reflected from surface 134 thereon instead of being channeled into delay lines) or the light is conducted to or away from the image plane 138 by waveguides 136.

The optical path is switched between the I/O/reference set (the lower set in FIG. 1*b*) and the delay-line set (the upper set in FIG. 1*b*) by means of the merged dual White Cell and an array of O-MEM mirror switches 122. The present White Cell configuration improves upon a prior approach suggested by researchers at Ohio State University in their LEOS publication. The present MDF White Cell 100 comprises two White Cell regions 140, 142 that are optically coupled to the shared array of O-MEM switches 122. One of the White Cell regions (the upper region 140) is selected when the mirrors 122 are tilted up (e.g., to, say, +20 degrees). This White Cell region 140 contains the O-MEM switches 122 as well as the optical-waveguide delay lines 112, 116. The other White Cell region (the lower region 142) is selected when the mirrors 122 are tilted down (e.g., to, say, −20 degrees). This second White Cell region 142 contains the O-MEM switches 122 and the input/output fibers and reference delays.

Each traversal through the MDF White Cell 100 accesses a successive mirror switch of the O-MEM array 122. In this way, the optical path progresses from input fiber 132*i* to output fiber 132*o* and through the selected delay lines 112, 116 or reference delay 134. For B bits of delay, one needs to use B+2 switches, since two switches are used for directing light from/to the input and output fibers, respectively. Light can traverse between the two region 140 and 142 since they share the same mirror region 120. The function of the lens 144 is discussed in the patents of Anderson and Collins noted above.

Figure 2:
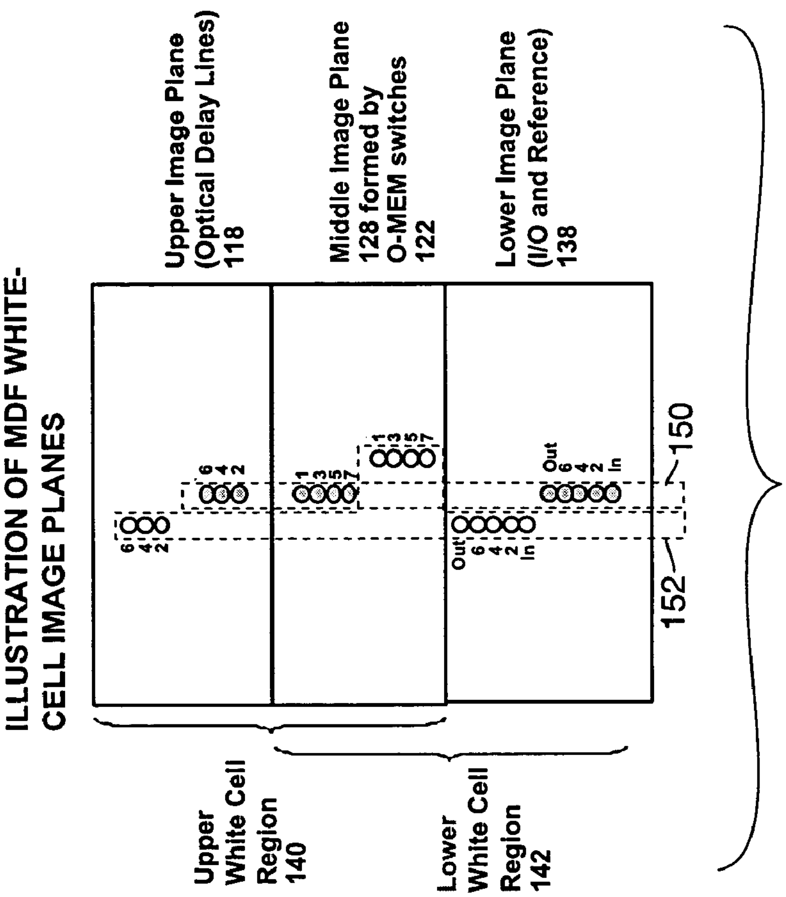
FIG. 2 illustrates the optical paths through a MDF White Cell.

The path of traversal of the light through the switches of the O-MEM array is illustrated by FIG. 2 for two different delay selections 150, 152. These separate delay selections could correspond to different antenna beams or different rows of antenna elements.

The MFD White Cell has three different image planes that are located adjacent to each other. The upper (or first) image plane 118 contains images of the entrances/exits of the waveguides 116 for the delay lines 112, 116. The lower (or second) image plane 138 contains the reference-delay mirror surface 134 and also images of the entrances/exits for waveguide connectors for the input and output fibers. The middle (or third) image plane 128 contains the O-MEM array switches 122.

For each delay selection 150, 152, the light undergoes a number of bounces off the image planes 118, 128, 138. The sequence of possible bounces are numbered in FIG. 2, with the input and output intersections labeled by In and Out. The light bounces alternately between the middle image plane 128 and either of the upper image plane 118 and lower image plane 138. Whether the upper or the lower image plane is selected for the next bounce depends on whether the O-MEM mirror for the present bounce is tilted upward or downward. Note that the sequence of bounces (explained in greater detail below) proceeds in the upward direction for upper 118 and the lower 138 image planes. However, the sequence of bounces proceeds in the downward direction for the middle image plane 128. Essentially, for the upper White Cell region 110, the O-MEM mirror image is located at the lower portion of that cell. However, for the lower White Cell region 130, the same O-MEM mirror is imaged onto the upper portion of that cell.

Consider delay selection 150. The light comes in the In port 132*i* (FIG. 1, labeled simply "In" on the lower image plane 138 of FIG. 2) and traverses to the mirror (of array 122) labeled with the numeral "1". Depending on the tilt of this mirror, the light is either reflected back towards the lower image plane 138 (when the mirror is tilted down) or is reflected towards upper image plane 118 and the delay lines 112, 116 thereat (when the mirror is tilted up). So, depending on the tilt of that mirror (at numeral 1), the light traverses to numeral 2 either at the lower or upper image plane. If the light traverses to the upper image plane, then additional (one bit worth) delay is inserted. Otherwise, the light traverses to the lower plane where no additional delay is inserted (the bit is zero). The significance of the bit corresponds to the length of the corresponding delay line 112, 116. The light is then reflected back to the array 122 of O-MEMS where it hits another mirror (labeled "3" in this case) and is reflected either toward the lower image plane 138 (when no additional delay is to be inserted) or toward the upper image plane 118 (when additional delay is to be inserted). In either case, the light from the O-MEMS labeled with the numeral 3 traverses to a spot labeled with the numeral 4 on either the upper or lower image planes. This process continues until the light is reflected back to the Out Port 132*o* (labeled simply as "Out" on FIG. 2).

The mirror labeled "7" in the middle image plane would always point downward in this embodiment in order to return the light to the associated Out Port 132*o*, so there is no need for the last mirror (number "7" in this embodiment) to be moveable.

Figure 1D:
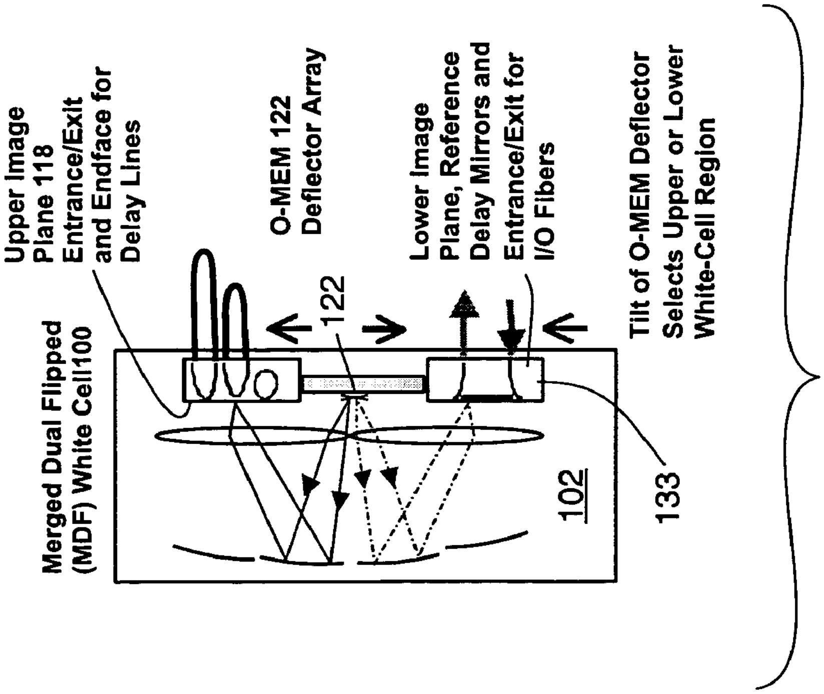
FIG. 1*d* is similar to FIG. 1*b*, but provides still additional information for the reader.

FIG. 1*d* provides some additional information regarding this embodiment. In this figure only one O-MEM mirror 122 is depicted. It is shown in two possible positions: (i) a first position in which it reflects light (drawn in solid lines) towards the first (or upper) image plane 118 and (ii) a second position in which it reflects light (drawn in broken lines) towards the second (or lower) image plane 138.

A Wavelength Tapped Delay White Cell

Figure 3B:
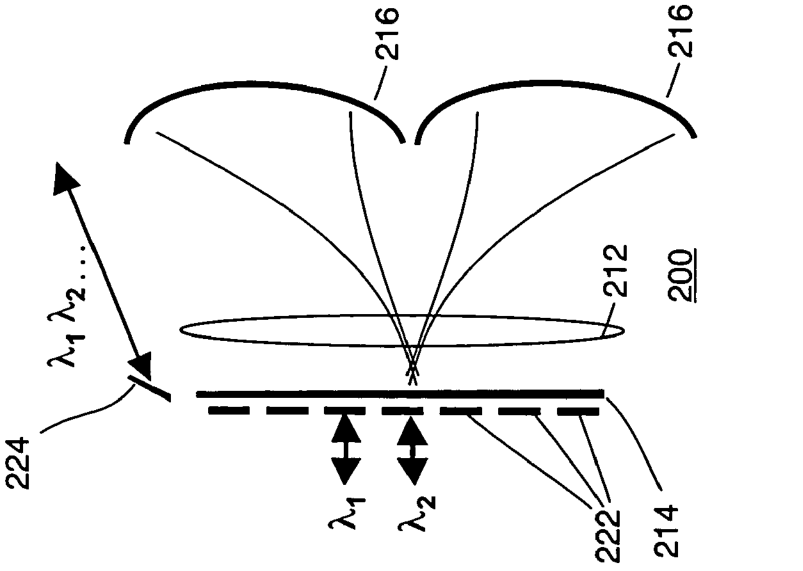
FIGS. 3*a* and 3*b* are schematic drawings of a Wavelength Tapped Delay (WTD) White Cell, FIG. 3*a* providing an end view of WTD White Cell and FIG. 3*b* providing a side elevation of the WTD White Cell.
Figure 3A:
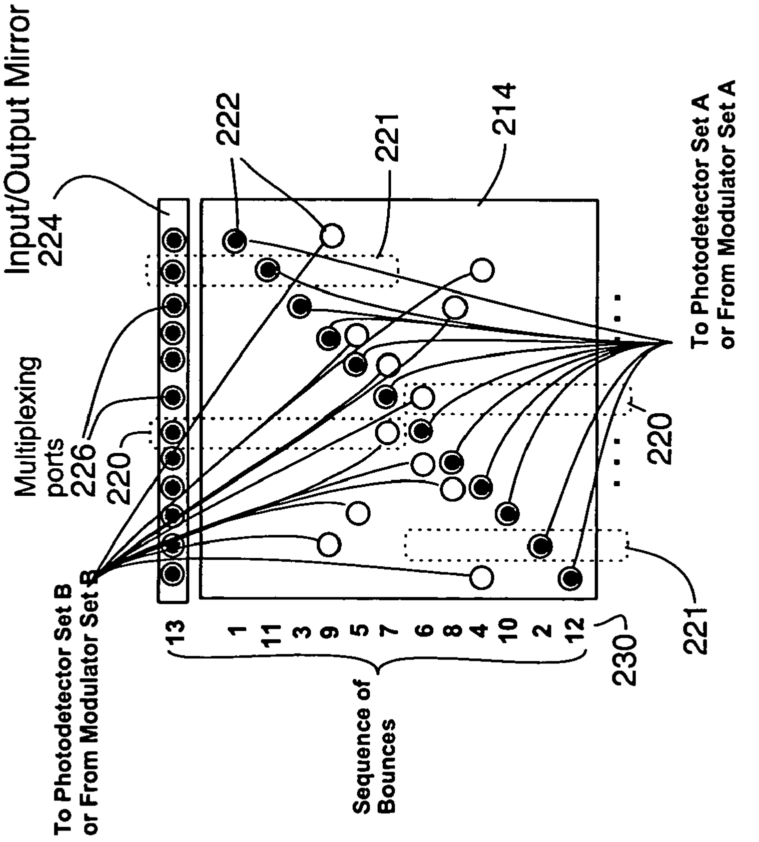

A Wavelength Tapped Delay (WTD) White Cell 200 contains a single White Cell optical cavity 210 instead of the dual cavities of the MDF White Cell 100. It also does not contain O-MEM switches, but selects the optical path lengths by the locations of its entrance/exit ports 220. FIGS. 3*a* and 3*b* show an embodiment of a WTD White Cell 200. The WTD White Cell 200 makes use of free-space optical delays, with the White Cell cavity confining the light in a compact package. This embodiment is similar to the prior art White Cells of Anderson and Collins in that it uses a lens 212 and flat mirror plane 214 instead of a curved mirror on one side of the cavity. The two mirrors 216 on the other side of the cavity are preferably spherically curved, as usual. However, instead of taking the light into and out of the White Cell from the two ends of the flat mirror plane 214, as is done in the prior art, the WTD White Cell 200 has taps 218 located within the flat mirror plane 214 for one of the inputs/outputs 220. The other input/output is located at one end of the flat mirror plane, which contains a set of mirrors 224 acting as multiplexing ports 226.

The taps 218 of the WTD White Cell 200 are preferably implemented by sets of Fabry-Perot (FP) transmission filters 222 that are located at specific spots on the flat mirror 214. These filters 222 tap light of specific wavelengths into (or out of) the optical cavity 200 and reflect light of the other wavelengths (so that light of those wavelengths remain in the optical cavity). Each optical wavelength can be associated with a given row of antenna elements or a given antenna beam angle.

The Fabry-Perot filters 222 are responsive to different frequencies (or wavelengths). So this embodiment, the WTD White Cell 200, is fundamentally different from the MDF White Cell 100 where the path lengths are controlled externally as opposed to this embodiment where the path lengths are a function of frequency.

A set of time delays can be mapped onto the surface of the flat mirror 214, with each row of spots on the mirror matched to the same time delay. Different columns of spots (or pairs of columns) may correspond to signals for different antenna beam angles or different antenna elements. The FP filters (mirrors) 222 located at various spots on the flat mirror 214 couple light into (or out of) the WTD White Cell 200. Different FP mirrors 222 preferably have different transmission-peak wavelengths. In this way, each entrance (or exit) spot is coded in wavelength. Each wavelength could represent a particular time delay (e.g. corresponding to a particular antenna element or a particular row/column specification for a particular antenna beam angle).

Note that the light must be incident onto the FP mirrors 222 at a proper angle. The light traveling through the White cell 200 progressively bounces off spots on the flat mirror 214 in the sequence 230 shown on FIG. 3*a*. The sequence 230 for light entering from the FP mirrors 222 is illustrated in FIG. 3*a*. The reverse sequence would apply for light exiting from the FP mirrors 222. Each bounce represents an increment in the time delay. The longest and shortest delays are tapped by FP mirrors 222 located at the upper or lower edges of the mirror 214. Intermediate delays are obtained by tapping in (or out) near the center of the mirror 214. All of the light (at multiple wavelengths) for a given beam angle is coupled out of (or in to) the White Cell cavity 210 through the same spot 226 on the mirror 224 (i.e., they become wavelength multiplexed together). This light can be directed to a photodetector, which would then combine the signals in the RF electrical domain. Alternatively, the light can be supplied by lasers of multiple wavelengths to the same spot 226 on the mirror 224. The spacing between adjacent bounces on the flat mirror 214 is determined by the spacing between the centers of curvature of the two curved mirrors 216 of the White Cell. Thus, this spacing is preferably kept small to obtain the large number of bounces needed for antenna arrays with many elements.

For one mode of generating the WTD beamformer, a group of FP mirrors 222 in each column or column pair 220, 221 is connected to a distinct antenna element, with the central elements of the antenna array associated with the center columns and the outer elements with the outer column pairs. Multiple signals corresponding to multiple antenna beam angles may couple through the same multiplexing port 226 on the mirror 224 with those signals having different wavelengths corresponding to different antenna element delays.

Figure 3D:
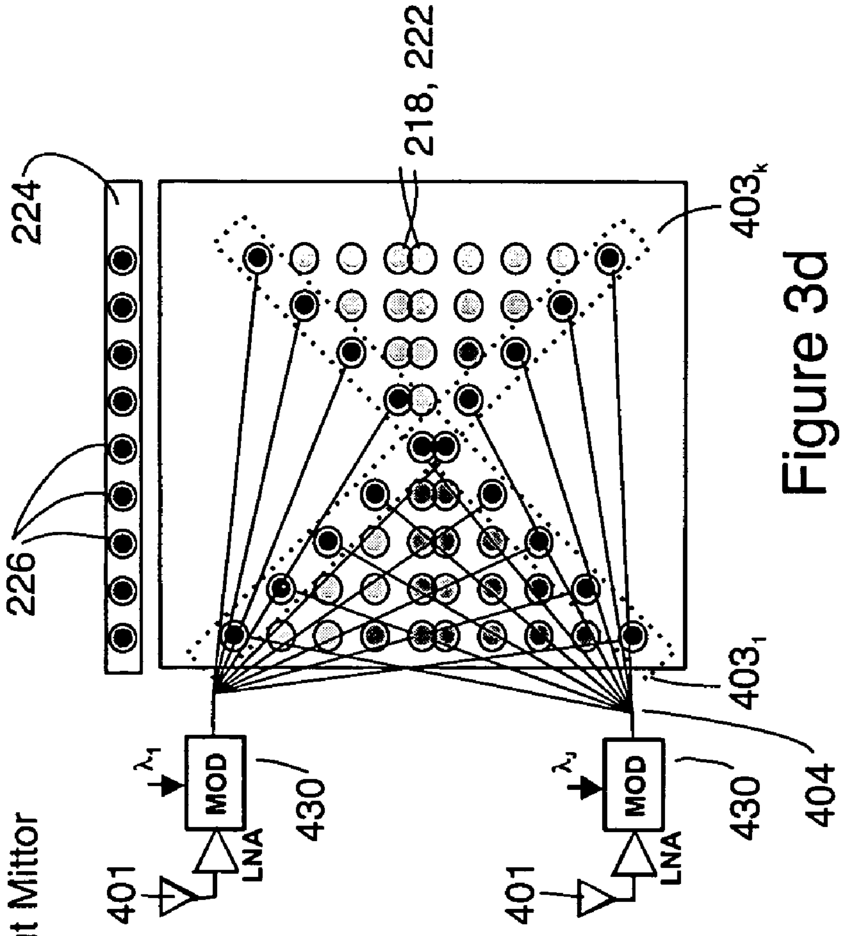
FIGS. 3*c* and 3*d* provide schematic views of the taps in a WTD White Cell.
Figure 3C:
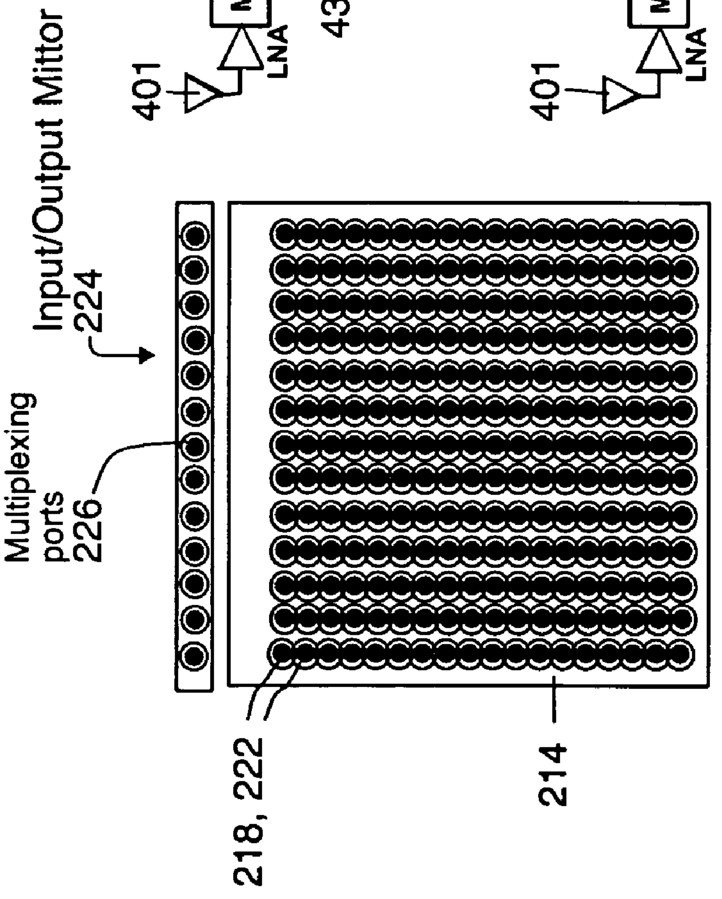

For another mode of generating the WTD beamformer, groupings of the FP mirrors 222 that are associated with the same antenna element are located along diagonals of the flat mirror 214. FIG. 3*c* shows an array of FP mirrors 222 closely packed on plane 214. FIG. 3*d* shows a subset of the same FP mirrors 222, but in this case the columns of mirrors 222 are shown spread apart and some rows are not shown for ease of illustration. In FIG. 3*d* the connections to two representative antenna elements 401 are depicted, showing the association with groups $\mathbf{403}_1 \ldots \mathbf{403}_k$ of FP mirrors.

FIG. 3*d* shows light being supplied to the taps 218 on the flat mirror plane 214. For any given antenna element 401 and any given frequency or wavelength ($\lambda_1, \ldots,$ or $\lambda_j$), only certain locations on the flat mirror plane 214 will serve as taps and will be frequency-responsive and those frequency-responsive FP filter/taps 222/218 will allow the light of the selected frequency to enter the optical cavity of the White Cell 200. The light, after bouncing in the sequence discussed with reference to FIG. 3*a*, and thus being appropriately time-delayed, will exit via exit mirror 224. In this case, each multiplexing port 226 is associated with a different antenna beam angle.

A way to further distinguish signals for multiple antenna beams that have delays produced by the same WTD White Cell 200 is to use different subsets of optical wavelengths for those beams. This use of different subsets of optical wavelengths is described by Stephens in the aforementioned U.S. Pat. No. 6,452,546, which patent is owned by the assignee of this application. The wavelength of each subset of optical wavelengths corresponds to the different antenna element delays of a particular antenna beam angle. It may be possible to couple the wavelengths within a subset through the same set of FP mirrors by proper design of the transmission bandwidth of those mirrors.

Cascaded WTD and MDF White Cells

Figure 4:
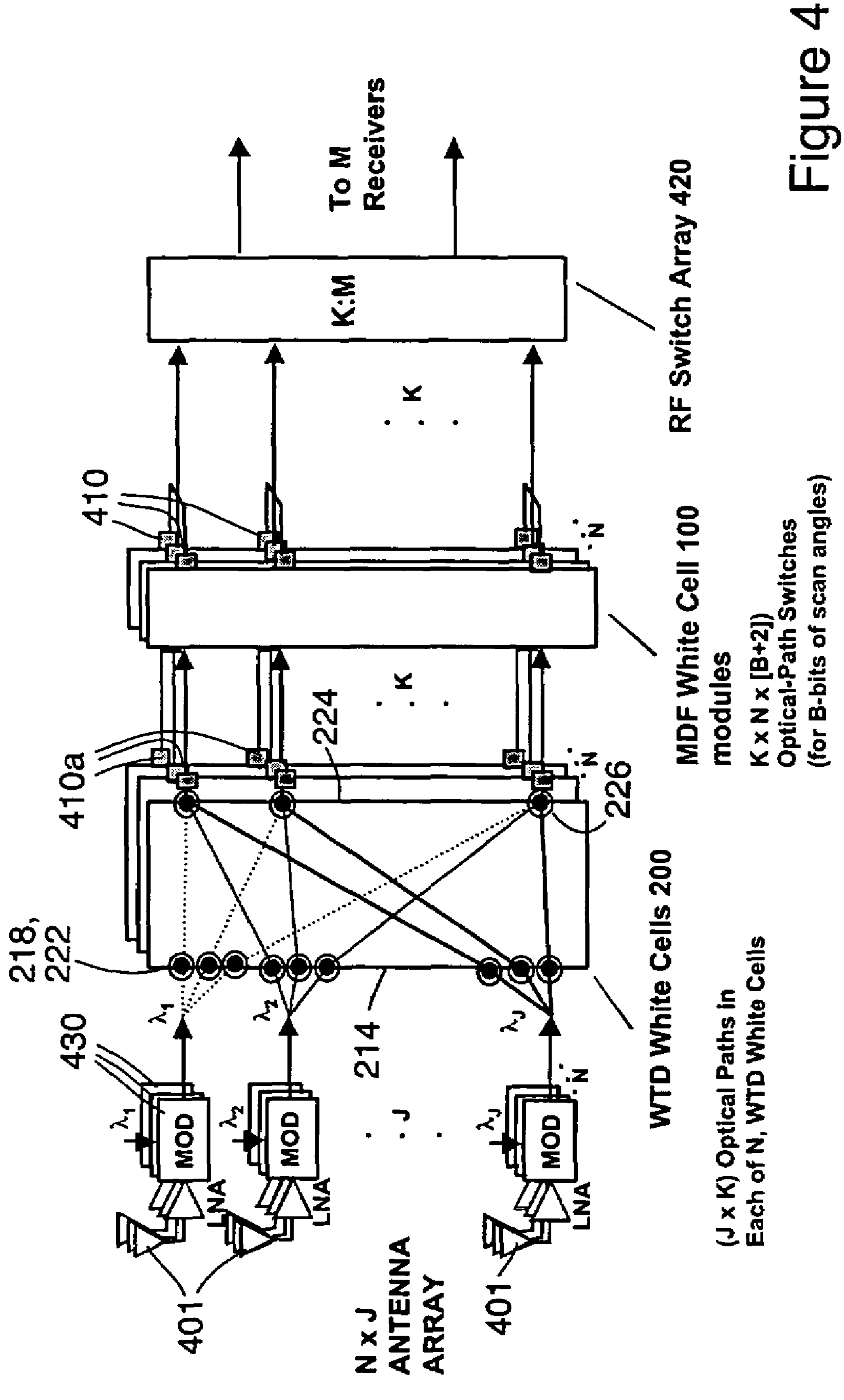
FIG. 4 depicts a beamforming receiving architecture with cascaded MDF and WTD White Cells.
Figure 5:
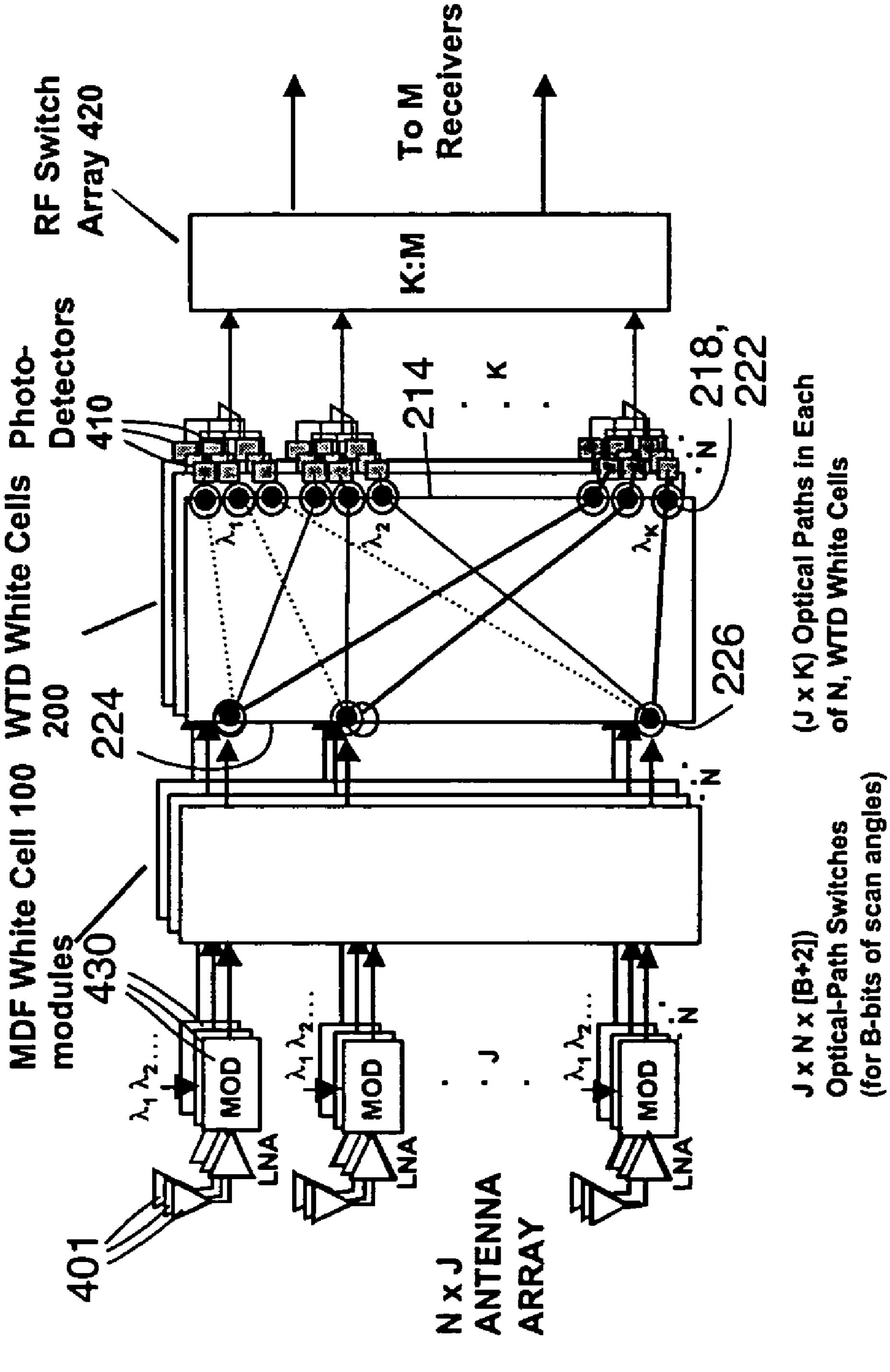
FIG. 5 depicts another beamforming receiving architecture with cascaded MDF and WTD White Cells.

The WTD White Cells 200 and MDF White Cells 100 can be cascaded together. One beamformer architecture with such a cascade is illustrated in FIG. 4 and another beamformer architecture with such a cascade is illustrated in FIG. 5. These figures, and the following discussions, also further elucidate other modes of operation of the WTD White Cell 200. The antenna Receive function is shown. As is depicted by FIG. 4, a set of WTD White Cells 200 and a set of MDF White Cell 100 modules form the beams for an array of N×J antenna elements. There are N WTD White Cells 200, with each WTD White Cell 200 having J sets of inputs. A possible arrangement of those inputs is illustrated by FIG. 3*d*. Each set 403 of input taps 222 of a WTD White Cell 200 contains K input taps 222, corresponds to a distinct antenna element 401 and is associated with a common wavelength ($\lambda_1$, $\lambda_2$, . . . , $\lambda_1$). The K input taps of a given set 403 are associated with K different simultaneous antenna beams defined by WTD While Cell 200. Typically, K≦J. The signal from a given antenna element 401 is preferably amplified in a LNA and then modulates an optical carrier of wavelength ($\lambda_1$ . . . . $\lambda_i$) by means of an opto-electronic modulator MOD. The resulting RF-modulated optical signal is split into K paths that distribute those K portions of the RF modulated optical signal to the multiple FP mirror input taps 222 corresponding to that element. Note that the multiple paths between the split and the multiple FP mirror taps 222 preferably have the same length. The differences in delay that define the antenna beam angle thus are produced solely by the differing locations of these taps 222 in WTD White Cell 200. The WTD White Cell 200 would typically also have K outputs. Those outputs correspond to different antenna beam positions that are defined by the various path delays of the White Cell. Note that the WTD White Cell 200 could be configured to define as many as J possible different antenna beam positions. Each output is taken from a different spot on the I/O mirror 224 of the White Cell and also is associated with a different column (or column pair) of spots in the flat mirror 214. The WTD White Cell 200 could have as few as M outputs (with M≦J), where M is the number of simultaneous antenna beams processed by the receivers of the antennas.

Each output port 226 of the WTD White Cell 200 has multiple wavelengths multiplexed together. Those wavelength-multiplexed optical signals are routed through the MDF White Cell 100 modules. The MDF White Cell 100 imposes an additional prescribed time delay to each of those signals. Signals from the same WTD White Cell 200 could have the same or different time delay added to them. The MDF White Cell 100 provides the time delays for the N columns of antenna elements and for K possible beam positions along their other axis. Phase coherent signal summation for the J time-delayed signals (of J multiple wavelengths) is done at each photodetector 410 to define the beam angle in the axis of the J antenna elements. There are N WTD White Cells associated with N sets of J MDF White Cells for the N columns antenna elements. The outputs of groups of N photodetectors 410 are then summed to define the beam angle in the axis of the N elements. The result is K separate signals. An K:M RF switch array 420 then can be used to select and connect those K signals to M receivers, for the multiple antenna beams.

If the MDF White Cells 100 are omitted, then the photodetectors 410 are moved to the location identified by numeral 410*a* at the outputs of the WTD White Cells 200. In such an embodiment the antenna would form multiple beams only in one scan dimension (e.g. in an azimuth direction with the beams all having a common elevation angle). By using both the MDF White Cells 100 and the WTD White Cells 200 cascaded as described above, two dimensional scanning can be obtained.

A second beamformer architecture is shown in FIG. 5. This figure illustrates the WTD White Cell 200 operating in the reverse direction. For this architecture, the MDF White Cell 100 is located closer to the antenna elements and the WTD White Cells 200 are located closer to the M receivers. Again, the antenna Receive function for a N×J array is illustrated. K different optical wavelengths are multiplexed together and supplied to each modulator, which is associated with a given antenna element. Typically K<J, with K corresponding to the number of simultaneous beams defined by the WTD White Cells. The RF-modulated light is then supplied to the MDF White Cell 100, which produces the time delays for defining the beams in the axis of the N antenna elements. Those N sets of J time-delayed signals are then supplied to N WTD White Cells 200.

Each WTD White Cell 200 now has J wavelength multiplexed inputs. Those inputs are supplied to the I/O mirror 224 of White Cell 200 and mirror 224 now functions as an "input" mirror to White Cell 200. The FP mirror taps 222 are used as outputs of the White Cell. Each FP mirror tap is supplied to a different photodetector 410. The photodetectors 410 could be mounted directly above the FP mirror taps. A possible arrangement of the FP mirror taps is illustrated in FIG. 3*a*, with taps associated with the same wavelength being grouped together. Photodetectors 410 associated with a common optical wavelength are likewise grouped together into the same set. The outputs from photodetectors 410 of the same set are combined together to produce a summed RF signal. For example, the optical paths associated with photodetector set A of FIG. 3*a* are illustrated by heavy lines in the WTD White Cell 200 in FIG. 5. The optical paths associated with two other photodetector sets are illustrated in FIG. 5 by relatively thin lines and by dotted lines. The various optical paths between the FP mirror taps 222 and photodetectors 410 of the same set should preferably have the same length. Furthermore, the various electrical paths from photodetectors 410 to the point at which their outputs are summed together also should preferably have the same length.

It is possible to sum the output currents from multiple photodetectors 410 directly by connecting them to a common summing junction input of a RF amplifier (such as a trans-impedance amplifier, not shown). The maximum number of photodetector outputs that can be combined in this manner depends on the signal bandwidth needed and on the bandwidth of the photodetectors 410, which are connected in parallel. For example, photodetectors 410 that have bandwidths exceeding 40 GHz are available commercially. More than sixteen of these photodetectors can be connected together when the required signal bandwidth is 2 GHz. If the output from even more photodetectors 410 must be summed together, those devices can be grouped into sets of sixteen (for example), with the combined output for each set further summed by conventional RF summing methods used for phased array antennas.

The summed photodetector outputs from different WTD White Cells 200 that correspond to the same beam position in the axis of the J elements are then summed together using conventional RF methods. This summing defines the beam position in the axis of the N elements. The result is K possible beam positions. A K:M RF switch array 420 then selects among those possible beam positions for the signals to the M receivers. For both architectures illustrated by FIGS. 4 and 5, the selection of the beam position is done partly by the RF switch array settings (which select the beam position in one axis) and partly by the settings of the optical switches in the MDF White Cell 100 (which select the time delays to form the beam in the other axis).

With the understanding provided by the descriptions in the present disclosure, one knowledgeable in the art of photonics and RF antennas should be able to derive suitable architectures for the antenna Transmit function. These architectures could include use of optical modulators, photodetectors, multiple optical wavelengths, the MDF White Cell 100 and WTD White Cells 200.

Figure 6:
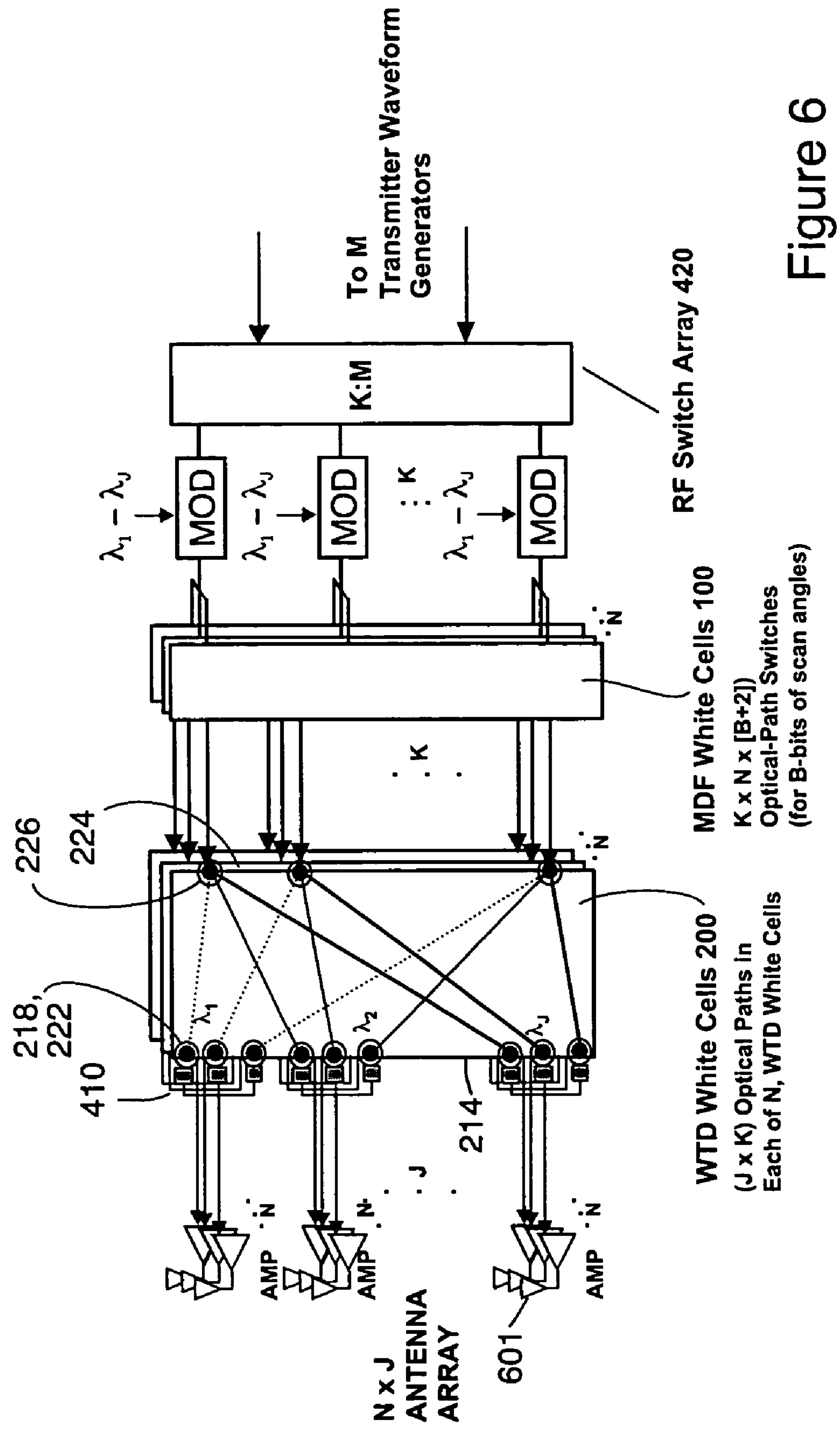
FIGS. 6 and 7, respectively, are conceptually similar to FIGS. 4 and 5, respectively, but show transmitting architectures with cascaded MDF and WTD White Cells.
Figure 7:
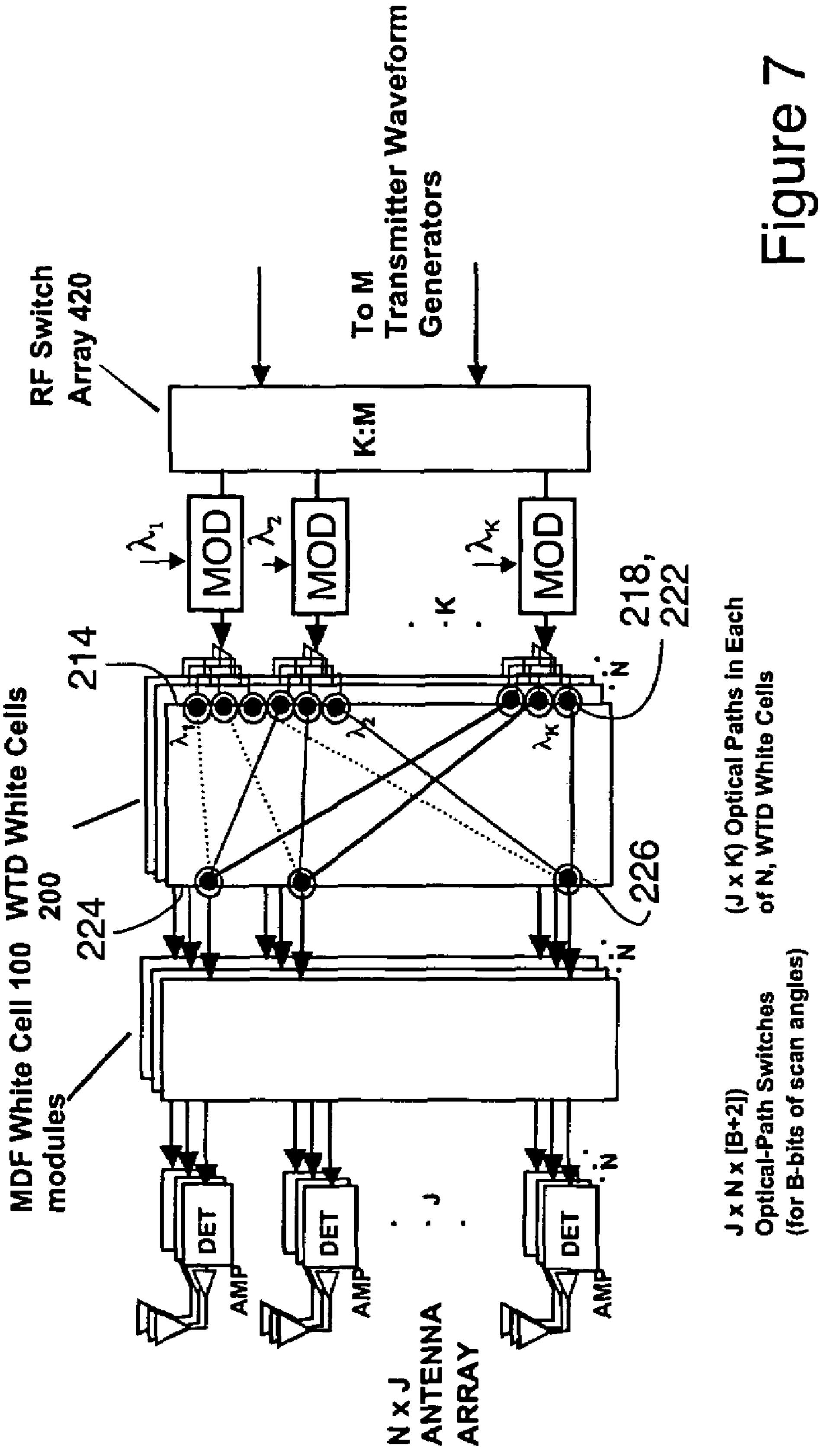

FIGS. 6 and 7, respectively, are conceptually similar to FIGS. 4 and 5, respectively, but show transmitting architectures with cascaded MDF and WTD White Cells as opposed to receiving architectures.

For the transmit architecture of FIG. 6, the WTD White Cells 200 are operated in a reverse function compared to the receiver architecture of FIG. 4. This reverse operation of the WTD White Cells 200 was described previously for the architecture of FIG. 5. Light at multiple wavelengths ($\lambda_1$, $\lambda_2$, . . . and $\lambda_J$) is output from the modulators MOD and then the wavelengths are each time delayed with an appropriate time delay by the MDF White Cells 100 to thereby define beam positions along the axis of the N antenna elements. That light is then supplied to the multiplexing ports 226 in mirrors 224 of the WTD White Cells 200. The wavelength selective taps 218 function as the outputs of the White Cells 200. The output of each tap 218 is supplied to a separate photodetector 410 and the taps 218 are grouped into sets (e.g. 403$_1$ & 403$_K$ as is illustrated by FIG. 3*d*). The optical paths associated with the same set of taps (e.g. 403$_1$ or 403$_K$) are illustrated in FIG. 6 by lines having a common weight and style (e.g. solid and heavy). The optical paths associated with different sets of taps are illustrated with lines of different weights and styles (e.g. solid and heavy compared to light and dotted). Groupings of outputs from the photodetectors 410 that are associated with the same antenna element are then summed together in the RF domain and typically feed a RF power amplifier that supplies the signal for the antenna elements. Techniques for summing together the outputs of multiple photodetectors are discussed above in connection with FIG. 5 and those techniques can also be applied here as well.

For the transmit architecture of FIG. 7, the WTD White Cells 200 are operated in a manner similar to that of FIG. 4. In this embodiment, light of a single wavelength ($\lambda_1$, $\lambda_2$, . . . or $\lambda_K$) is supplied to each modulator MOD, which modulates the desired RF signal for the antenna beams associated with that wavelength ($\lambda_1$, $\lambda_2$, . . . or $\lambda_K$). The RF-modulated light at each wavelength is divided among N WTD White Cells 200 and then is further divided among J input taps 218 of each WTD White Cell 200. The taps 218 are grouped into groups (e.g. 220, 221 as illustrated in FIG. 3*a*) that are associated with the same antenna element. Light from the taps 218 of the same group (e.g. 220, 221) is coupled to the same multiplexing port 226 for output from the WTD White Cell 200. That outputted light, which comprises RF-modulated light at multiple wavelengths ($\lambda_1$, $\lambda_2$, . . . or $\lambda_k$) is fed, after passing through a MDF White Cell 100, to the photodetector 410 associated with that same antenna element. The photodetector 410 performs coherent summation of the RF signals, carried at the multiple wavelengths and then typically delivers the summation (the summed signals) to a power amplifier associated with that antenna element.

The MDF White Cell 100 is a reversible optical element. Thus its input ports 132*i* and its output ports 132*o* can be reversed in operation so that the input ports 132*i* function as output ports and output ports 132*o* function as input ports instead. The operation of the MDF White Cell 100 is the same for both receiver and transmitter architectures.

The particular beamforming architecture that is selected for a given antenna system depends on the applications of the antenna system. For example, the WTD White Cells 200 in the architecture of FIGS. 4 and 6 could be used to establish various elevation angles for the antenna beams, with a given port of the WTD White Cell 200 associated with a particular elevation angle. In that case, each WTD White Cell 200 would connect to a different column of antenna elements. One or more receivers could be assigned to each multiplexing port 226. The MDF White Cell 100, again with a different module for each receiver, could be used to steer the beam in azimuth within a given elevation swath. This latter example is especially relevant to some air-traffic control scenarios. Note that different elevation swaths may have different sized targets or different needs for spatial resolution or Doppler performance (i.e., different frequency bands and instantaneous bandwidths). This varying need can be addressed by groupings with larger or smaller numbers of antenna elements and of possible time delays produced by the White Cells described herein.

Each WTD White Cell 200 in the architectures of FIGS. 5 and 6 could also be used to form the beams for a subarray of J elements (arrayed along one of the two axes). Thus, each port of the WTD White Cell 200 would correspond to a coarse beam position or coverage area. A different receiver could be assigned to each of those coarse beam coverage areas. The MDF White Cell 100, with a different module for each receiver, could then be used to steer the beams within those coverage areas along that axis. Multiple receivers or transmitters could be assigned to the same coverage area if the communications traffic or number of radar targets in a given area is high. The MDF White Cell 100 also could be used to steer the beam in an orthogonal axis as described previously herein.

Having described this invention in connection with a number of embodiments, modification will now certainly suggest itself to those skilled in the art. As such, the invention is not to be limited to the disclosed embodiments except as required by the appended claims.

What is claimed is:

1. A merged dual flipped White Cell including:

(a) a dual White Cell having first and second cell regions;

(b) an optical deflector array for selectively deflecting light to either a first image plane associated with said first region or to a second image plane associated with said second region;

(c) a plurality of guided-wave optical delay lines, each of said delay lines having an input portion for receiving light at said first image plane and a separate output portion for returning delayed light at said first image plane, said input portion and separate output portion including waveguide sections that are tilted with respect to the first image plane; and (d) a plurality of reference mirrors and separate guided-wave optical input and output ports in optical communication with said optical deflector array and with said plurality of delay lines.

2. The merged dual flipped White Cell of claim 1 wherein the plurality of optical delay lines has a plurality of ports and wherein the White Cell includes a light refractive element for imaging light onto the optical deflector array, the plurality of ports for the plurality of optical delay lines, the plurality of reference mirrors and the plurality of optical input and output ports.

3. The merged dual flipped White Cell of claim 2 wherein the optical deflector array includes an array of optical path switching devices for selectively adjusting light-reflective surfaces so as to selectively deflect light to either said first image plane associated with said first region of said White Cell or to said second image plane associated with said second region of said white cell.

4. The merged dual flipped White Cell of claim 3 wherein the array of optical path switching devices includes an array of MEM devices for selectively moving the light-reflective surfaces so as to selectively deflect light to either said first image plane associated with said first region of said White Cell or to said second image plane associated with said second region of said white cell.

5. The merged dual flipped White Cell of claim 3 wherein the optical deflector array includes MEM devices for moving associated mirrored surfaces, the MEM devices each being responsive to an electrical voltage or current for controlling the associated mirrored surface.

6. The merged dual flipped White Cell of claim 3 wherein the first image plane and the second image plane are co-planar.

7. The merged dual flipped White Cell of claim 1 wherein the reference mirrors reflect light back to the optical deflector array.

8. The merged dual flipped White Cell of claim 7 wherein the reference mirrors provide a reference time delay.

9. The merged dual flipped White Cell of claim 1 wherein the White Cell includes four convex mirrored surfaces for reflecting light (i) to and from the first image plane and the optical deflector array and (ii) to and from the second image plane and the optical deflector array.

10. The merged dual flipped White Cell of claim 1 wherein the input and output ports contain waveguide sections that are tilted with respect to the second image plane.

11. The merged dual flipped White Cell of claim 1 wherein the plurality of optical delay lines each produce a distinct time delay.

12. The merged dual flipped White Cell of claim 11 wherein each of the distinct time delays of the plurality of optical delay lines is associated with a time delay for steering the beam of an antenna array.

13. The merged dual flipped White Cell of claim 1 wherein the optical delay lines are implemented at least in part by waveguides in at least one substrate.

14. The merged dual flipped White Cell of claim 13 wherein the optical delay lines further comprise optical fibers in optical communication with at least selected ones of said waveguides.

15. The merged dual flipped White Cell of claim 14 wherein a plurality of said substrates are arranged with endfaces thereof disposed in a planar array defining said first image plane.

16. The merged dual flipped White Cell of claim 1 wherein the input and output ports are provided by waveguides in at least one substrate.

17. The merged dual flipped White Cell of claim 16 wherein a plurality of said substrates are arranged with endfaces thereof disposed in a planar array defining said second image plane.

18. The merged dual flipped White Cell of claim 17 wherein the second image plane comprises a two dimensional array of images associated with a two dimensional array of input and output ports.

19. A wavelength tapped delay White Cell comprising: a White Cell optical cavity having a flat mirror plane on a first side thereof and curved mirrors on a second side thereof, the flat minor plane having an array of frequency-selective taps.

20. The wavelength tapped delay White Cell of claim 19 wherein the array of frequency-selective taps comprises an array of frequency-selective filters disposed on said flat mirror plane.

21. The wavelength tapped delay White Cell of claim 20 wherein the array of frequency-selective filters comprises an array of Fabry-Perot frequency-selective fitters that transmit light of one or more selected frequencies and reflect the light of other non-selected frequencies.

22. The wavelength tapped delay White Cell of claim 19 further including an input/output mirror for receiving light or supplying light to one of the curved mirrors on the second side of the White Cell cavity.

23. The wavelength tapped delay White Cell of claim 19 further including at least one multiplexing port light-coupled to a subset of the frequency selective taps, the subset being associated with said at least one multiplexing port.

24. The wavelength tapped delay White Cell of claim 19 wherein the array of frequency-selective taps is a two dimensional array.

25. The wavelength tapped delay White Cell of claim 24 wherein selected ones of the frequency-selective taps in the two dimensional array receive incoming light from a common modulator, said selected ones being arranged diagonally through the two dimensional array of frequency-selective taps.

26. The wavelength tapped delay White Cell of claim 24 wherein selected ones of the frequency-selective taps in the two dimensional array provide light to a set of photodetectors, said selected ones being arranged diagonally through the two dimensional array of frequency-selective taps.

27. The wavelength tapped delay White Cell of claim 24 wherein selected ones of the frequency-selective taps in the two dimensional array receive incoming light from a common modulator through a multiplexing port, said selected ones being arranged parallel to a major axis of the two dimensional array of frequency-selective taps.

28. The wavelength tapped delay White Cell of claim 24 wherein selected ones of the frequency-selective taps in the two dimensional array provide light to a common photodetector through a multiplexing port, said selected ones being arranged parallel to a major axis of the two dimensional array of frequency-selective taps.

29. An antenna beamformer system comprising one or more wavelength tapped White Cells according to claim 19, optical modulators connected to an input of one of the one or more wavelength tapped White Cells and a plurality of photodetectors coupled to the frequency selected taps.

30. The antenna beamformer system of claim 29 wherein the switched path delay lines are provided by one or more Merged Dual Flipped White Cells, the Merged Dual Flipped White Cells comprising:

(a) a dual White Cell having first and second cell regions;

(b) an optical deflector array for selectively deflecting light to either a first image plane associated with said first region or to a second image plane associated with said second region;

(c) a plurality of guided-wave optical delay lines, each of said delay lines having an input portion for receiving light at said first image plane and a separate output portion for returning delayed light at said first image plane; and (d) a plurality of reference mirrors and separate guided-wave optical input and output ports in optical communication with said optical deflector array and with said plurality of delay lines.

31. The antenna beamformer system of claim 29 further including switched path delay lines disposed between the plurality of photodetectors and the optical modulators and wherein light at different wavelengths undergoes either different amounts of delay or a common amount of delay in the switched path delay lines.

32. The antenna beamformer system of claim 29 further including an array of antenna elements coupled to said optical modulators.

33. The antenna beamformer system of claim 29 wherein light from a single wavelength source is coupled to said optical modulators.

34. The antenna beamformer system of claim 29 wherein light from sources at multiple wavelengths is coupled to said optical modulators.

35. The antenna beamformer system of claim 34 wherein light at multiple wavelengths are combined in single ones of said plurality of photodetectors.

36. An antenna beamformer system comprising one or more wavelength tapped White Cells according to claim 19, photodetectors connected at an input of one of the one or more wavelength tapped White Cells and optical modulators coupled to the frequency selected taps.

37. The antenna beamformer system of claim 36 wherein light from a single wavelength source is coupled to said optical modulators.

38. The antenna beamformer system of claim 36 wherein light from sources at multiple wavelengths is coupled to said optical modulators.

39. The antenna beamformer system of claim 38 wherein light at multiple wavelengths is combined in single ones of said plurality of photodetectors.

40. The antenna beamformer system of claim 36 further including switched path delay lines disposed between at least one photodetector and the optical modulators and wherein light at different wavelengths undergoes either different amounts of delay or a common amount of delay in the switched path delay lines.

41. The antenna beamformer system of claim 36 wherein the switched path delay lines are provided by one or more Merged Dual Flipped White Cells, the Merged Dual Flipped White Cells comprising:

(a) a dual White Cell having first and second cell regions;

(b) an optical deflector array for selectively deflecting light to either a first image plane associated with said first region or to a second image plane associated with said second region;

(c) a plurality of guided-wave optical delay lines, each of said delay lines having an input portion for receiving light at said first image plane and a separate output portion for returning delayed light at said first image plane; and (d) a plurality of reference mirrors and separate guided-wave optical input and output ports in optical communication with said optical deflector array and with said plurality of delay lines.

42. A method of forming and/or detecting a radio frequency beam at an antenna array, the method comprising:

applying light waves of a single wavelength or of a plurality of discrete wavelengths to at least one optical modulator coupled to at least one wavelength tapped delay White Cell, wherein the at least one wavelength tapped delay White Cell has a White Cell optical cavity with a flat mirror plane on a first side thereof and curved mirrors on a second side thereof, the flat mirror plane having an array of frequency-selective taps;

applying RF signals to said at least one optical modulator and generating RF modulated light waves that are coupled to said at least one wavelength tapped delay White Cell, whereby said at least one wavelength tapped delay White Cell generates a plurality of time-delayed RF modulated light waves in response thereto; and coupling the plurality of time-delayed RF modulated light waves to at least one photodetector coupled to the said at least one wavelength tapped delay White Cell.

43. The method of claim 42 wherein the radio frequency beam is received at the antenna array and wherein the RF signals applied to said at least one optical modulator are obtained from the antenna array.

44. The method of claim 42 wherein the radio frequency beam is transmitted at the antenna array, wherein the RF signals applied to said at least one optical modulator are obtained from at least one transmitter waveform generator and wherein a signal output by the at least one photodetector is coupled to the antenna array.

45. The method of claim 42 wherein a plurality of light waves each of a discrete wavelength are coupled to different ones of the array of frequency-selective taps.

46. The method of claim 42 wherein the at least one wavelength tapped delay White Cell includes an input/output mirror for receiving light or supplying light to one of the curved mirrors on the second side of the White Cell cavity and wherein the input/output mirror has at least one multiplexing port light-coupled to a subset of the frequency selective taps, the subset being associated with said at least one multiplexing port.

47. The method of claim 46 wherein the light of multiple wavelengths is coupled to or from each of the at least one multiplexing port.

48. The method of claim 47 wherein each of said at least one multiplexing port is coupled to a photodetector, said photodetector combining the multiple time-delayed RF modulated light waves to produce a RF signal associated with a particular antenna beam direction.

49. The method of claim 45 wherein different ones of the time-delayed RF modulated light waves are coupled to different ones of the frequency selective taps, said different ones of the frequency selective taps being connected to different photodetectors, the different photodetectors generating different time-delayed RF signals.

50. The method of claim 49 further including combining the different time-delayed RF signals to produce a RF signal associated with a particular antenna beam direction.

51. The method of claim 42 further including coupling said at least one wavelength tapped delay White Cell to at least one merged dual flipped White Cell, the merged dual flipped White Cell including a dual White Cell with first and second cell regions, an optical deflector array for selectively deflecting light to either a first image plane associated with said first region or to a second image plane associated with said second region, a plurality of guided-wave optical delay lines, each of said delay lines having an input portion for receiving light at said first image plane and a separate output portion for returning delayed light at said first image plane, and a plurality of reference mirrors and separate guided-wave optical input and output ports in optical communication with said optical deflector array and with said plurality of delay lines, said at least one merged dual flipped White Cell being located between said at least one optical modulator and said at least one photodetector.

52. A method of forming and/or detecting a radio frequency beam at an antenna array, the method comprising:

applying light waves of a single wavelength or of a plurality of discrete wavelengths to at least one merged dual flipped White Cell, the merged dual flipped White Cell including a dual White Cell with first and second cell regions, an optical deflector array for selectively deflecting light to either a first image plane associated with said first region or to a second image plane associated with said second region, a plurality of guided-wave optical delay lines, each of said delay lines having an input portion for receiving light at said first image plane and a separate output portion for returning delayed light at said first image plane, said input portion and separate output portion including waveguide sections that are tilted with respect to the first image plane, and a plurality of reference mirrors and separate guided-wave optical input and output ports in optical communication with said optical deflector array and with said plurality of delay lines;

applying RF signals to said at least one optical modulator and generating RF modulated light waves that are coupled to said at least one merged dual flipped White Cell, whereby said at least one merged dual flipped White Cell generates a plurality of time-delayed RF modulated light waves in response thereto; and coupling the plurality of time-delayed RF modulated light waves to at least one photodetector coupled to the said at least one merged dual flipped White Cell.

53. The method of claim 52 wherein the radio frequency beam is received at the antenna array and wherein the RF signals applied to said at least one optical modulator are obtained from the antenna array.

54. The method of claim 52 wherein the radio frequency beam is transmitted at the antenna array, wherein the RF signals applied to said at least one optical modulator are obtained from at least one transmitter waveform generator and wherein a signal output by the at least one photodetector is coupled to the antenna array.

55. The method of claim 52 further including operating the deflector array to select different subsets of the plurality guided-wave optical delay lines and plurality of reference mirrors to generate different combinations of time-delayed RF modulated light waves.

* * * * *